United States Patent Office 3,700,472
Patented Oct. 24, 1972

3,700,472
ACID RESISTANT BASALT-CLAY PRODUCT AND SLIP CASTING PROCESS
Elisha Tauber, East St. Kilda, Victoria, Australia, assignor to Commonwealth Scientific and Industrial Research Organization, East Melbourne, Victoria, Australia
Continuation-in-part of application Ser. No. 421,998, Dec. 29, 1964. This application Aug. 1, 1969, Ser. No. 846,675
Claims priority, application Australia, Jan. 8, 1964, 39,557/64; Apr. 13, 1964, 43,139/64
Int. Cl. C04b 29/00, 33/18, 33/28
U.S. Cl. 106—39 R        7 Claims

ABSTRACT OF THE DISCLOSURE

Ceramic articles are prepared by mixing igneous rock particles, preferably basalt particles ranging in size from about 3 mesh to 200 mesh with slip-casting clay and water, slip casting the mixture and then firing the cast product at a temperature in the range of about 950° C. to about 1200° C. By varying the firing temperature, different ceramic products are produced. At a firing temperature of about 950° to 1150° C., a sintered heterogeneous product is obtained which is useful for building and ornamental purposes. The ceramic obtained by firing the cast product at about 1160 to 1200° C. is a substantially homogeneous material related to stoneware and characterized by a high degree of acid resistance as well as resistance to abrasion and to heat shock.

CROSS REFERENCE TO RELATED APPLICATION

This application is a continuation-in-part of my copending application Ser. No. 421,998, filed Dec. 29, 1964, and now abandoned.

BACKGROUND OF THE INVENTION

This invention relates to an improved ceramic composition and ceramic articles made therefrom, particularly ceramic compositions employing waste basalt fines. The invention is also concerned with a method for producing ceramic articles, including acid resistant ceramic articles wherein the articles are produced by means of slip casting or by pressing.

In certain areas, igneous rock and especially basalt is quarried extensively as an aggregate for roadworks and concrete. However, usually more than ten percent of the stone which results from such a quarrying operation is classified as too fine for salt as aggregate. These wastes represent an economic loss, and in addition, if left in the quarries, creates a serious health hazard as well as a storage problem.

Because of its low melting point, basalt has been melted and cast into products of various shapes; these products are known as fused-cast basalt. Fused basalt products are generally prepared by pouring the melt into sand molds and annealing the cast product. However, these castings must be finished by machine grinding when dimensional accuracy is required and they are exceedingly sensitive to thermal shock.

The extrusion and pressing of basalt particles has, in the past, been considered an unsuitable procedure due to the abrasiveness of basalt which causes undue wear on the equipment.

The cheapness and simplicity of slip-casting make it an ideal procedure for molding ceramic bodies. Unfortunately, slips made from conventional ceramic raw materials require a water content of up to 30 percent by weight to obtain good pouring properties. When large ceramic bodies are formed by slip-casting, the problems associated with the drying and firing of such large bodies containing a high initial water content become considerable. Further, almost all slip casting techniques require the use of finely divided particles.

In shaping large ceramic objects, relatively elaborate and expensive techniques such as compression molding and extrusion are usually employed in order to minimize the large degree of shrinkage and the possibility of cracking during drying and firing. Even under these conditions however, shrinkage of the molded articles often occurs to a considerable degree and it is difficult to produce a finished article of specified dimensions.

SUMMARY OF THE INVENTION

The principal objects of the present invention are the provision of ceramic products having highly desirable characteristics and an economical process for the preparation thereof.

Another object of the present invention is the provision of relatively dense ceramic products having a combination of desirable chemical and mechanical properties including acid and heat resistance and high compressive strength.

Another object of the present invention is the provision of a ceramic composition which can be used to form different types of ceramic products merely by varying the process conditions.

Still another important object of the present invention is the provision of a process involving the use of waste igneous rock particles, particularly basalt rock to produce highly desirable ceramic articles.

It has been discovered that highly desirable ceramic articles can be prepared from igneous rock particles by the technique of slip casting.

According to the invention, igneous rock particles ranging in size from about 1/8 inch to dust and slip-casting clay in an amount of about 10 to 25 percent by weight based on the weight of the mixture of rock particles and clay are mixed together with enough water to form a slip. The slip is then poured into a mold and dried to form a cast product. After removal from the mold, the cast product is fired at a temperature in the range of 950° C. to 1200° C.

A feature of the present invention is the discovery that two different types of desirable ceramic products, which products are also part of the present invention, are obtained by means of the present process by varying the temperature at which the cast composition is fired. At a firing temperature of about 950 to about 1150° C., the component materials are sintered, and a heterogeneous product is produced in which the basalt particles are usually distinguishable. At a higher firing temperature, i.e. about 1160 to 1200° C., at least some components of the rock are melted, thereby producing an essentially homogeneous product. The high temperature fired product is highly acid and heat-shock resistant. Both the low and high temperature fired products are relatively dense, nonporous products although these characteristics are especially pronounced in the high temperature fired material.

The low temperature fired ceramic is useful as building and decorative materials and the high temperature fired ceramic is related to stoneware.

DESCRIPTION OF THE PREFERRED EMBODIMENTS

Figure 1:
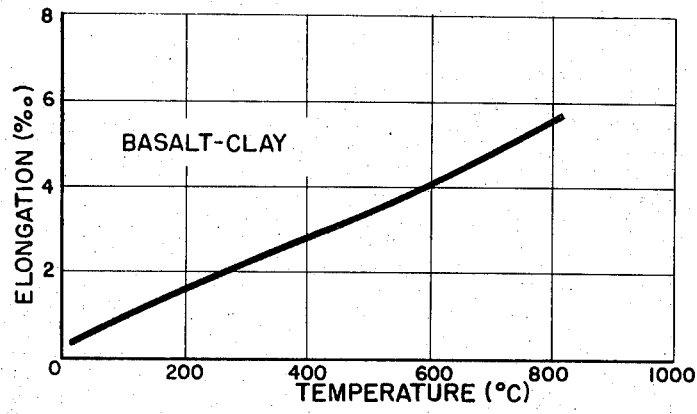
FIGS. 1-3 are dilatometric curves of ceramic materials of the present invention and FIG. 4 is a dilatometric curve of fused basalt; the curves are a plot of the expansion of the ceramic with changing temperature.

The slip-casting clays used in accordance with this invention are generally kaolinitic materials of extremely small particle size, which are readily dispersible to produce non-thixotropic, fluid dispersions which show a good response to deflocculants and give slip cast products having a high green strength. Such clays should not contain impurities which inhibit dispersion. Clays having these characteristics which may be used to form the present ceramic products include ball clays and fine grain-dispersible clays of the kaolinite, dickite and illite type. Preferably, the clays used in the present slip-casting process should not contain montmorillonite.

The preferred slip-casting clays are the "ball clays" which are well known in the ceramic art and which are typified by the English ball clays as described in "The ECC Ball Clay Book," published by English Clays Lovering Pochin & Co. Ltd., which book is incorporated herein by reference, particularly pp. 28-35 and the individual entries, see for example, "Ball Clay No. 661."

The chemical analysis of some typical ball clays used in the present slip-casting process are set forth in Table 1. Naturally, other clays having similar properties to the English ball clays can also be used, and one such clay is that obtained from Axedale in Victoria, Australia.

Igneous rock having a particle size of about ⅛ inch to about 200 mesh is used to prepare the present ceramic products in accordance with this invention, however, due to its ready availability and cheapness, basalt rock, and particularly waste basalt fines are generally used in the present process.

Substantially any type of basalt can be used, providing it is mechanically sound, i.e. contains no weathered or scoriated material which would lead to decreased mechanical strength in the final product. The chemical analysis of a typical basalt rock used in the present process is set forth in Table 1.

TABLE 1.—CHEMICAL ANALYSES OF BASALT AND CLAYS

|  | Basalt | Ball clay F | Ball clay 661 |
|---|---|---|---|
| $SiO_2$ | 44.95 | 57.2 | 52.41 |
| $Al_2O_3$ | 15.50 | 27.6 | 32.32 |
| $TiO_2$ | 2.77 | 1.3 | 2.17 |
| $Fe_2O_3$ | 2.04 | | |
| $FeO$ | 10.47 | | |
| $MgO$ | 7.43 | 0.6 | 0.16 |
| $CaO$ | 8.24 | 1.0 | 0.21 |
| $Na_2O$ | 3.04 | 0.6 | 0.22 |
| $K_2O$ | 1.98 | 3.1 | 1.55 |
| $P_2O_5$ | 0.52 | | |
| $MnO$ | 0.21 | | |
| $CO_2$ | 0.18 | | |
| LoI | 3.12 | 7.8 | 10.71 |
| Total | 100.45 | 99.2 | 99.75 |

According to the present invention, waste basalt fines obtained from a quarry, and in general, ranging in size from ⅛ inch to dust may be used without any preliminary grading. However, it is usually preferred, especially for slip casting to have a gradation of particle sizes ranging from about 18 BSS mesh down to about 180 to 200 BSS mesh (BSS mesh, refers of course to British standard sieves). According to the present invention, at least 80% by weight of the basalt particles should be above 200 mesh, as it is generally undesirable to have more than 20% of this material of 200 mesh or less and most preferably, at least 50% of the basalt particles are 60 mesh (BSS) or larger. The sieve analysis of some typical waste basalt fines are set forth in Table 2.

TABLE 2.—SIEVE ANALYSIS OF BASALT WASTE FINES
Weight retained (percent)

| Sieve [1] | ⅛-in. graded fines | ⅛-in. non-graded fines | Non-graded fines |
|---|---|---|---|
| 18 | 92.0 | | |
| 60 | 6.9 | 85.7 | 60.7 |
| 100 | 0.05 | 4.7 | 8.6 |
| <100 | −0.15 | | |
| 200 | | 4.9 | 30.5 |
| <200 | | −4.7 | −0.2 |

[1] No. 1 mm. sieve British Standard Series.

The presence of basalt particles of varying sizes is desirable for packing reasons; the interstices between larger particles may be packed with small particles. Further, less clay is required to surround a particular weight of coarse basalt than the same weight of fine particles since the ratio of surface area to weight is greater for fine than for coarse particles. Thus, a substantial proportion of coarse material has been found to be advantageous in the present process. In addition, the use of coarse particles results in a slip casting composition which has excellent flow characteristics with the use of a relatively small proportion of clay.

Fine and coarse basalt particles can also be combined to provide a mixture of particles of varying sizes as is preferred according to the present invention.

One of the features of the present invention is that only about 10 to about 20% by weight of water, and more preferably to about 14% by weight of water based on the weight of the dry materials is required to give a pourable slip. The specific amount of water necessary is determined principally by the type and amount of clay used. Thus, the slip casting mix contains only about 8 to about 15% by weight of water. The low initial water content of the slip permits the slip casting of large bodies, which can then be dried without cracking and which also undergo a minimum shrinkage during drying and firing.

Preferably, a deflocculating agent, also referred to as an "electrolyte," is added to the slip-casting compositions of the present invention. For the composition of the invention any of the standard deflocculants of the art may be employed, the usual range of proportions being from about 0.1 to 1% by weight of the dry mixture. Such deflocculating agents include sodium polyphosphates, "EDTA," sodium oxylate and ammonia. Mixtures of deflocculating agents, may be used. The preferred deflocculants are hexametaphosphate and ammonia; most preferably these are used in combination, the preferred proportions being sodium hexametaphosphate in an amount of from 0.1 to 0.4% by weight of the dry mixture and ammonia (usually a concentrated, i.e. 28% solution is used) in an amount of 2 to 8 ml. per kg. of the total aqueous mixture.

In preparing the slip-casting composition, usually the clay is dispersed in water with one or more electrolytes using a conventional high speed mixer. The basalt material is then mixed with the clay slip using a suitably robust machine such as a dough or concrete mixer. The clay-water slip may be kept in storage for any reasonable length of time without inconvenience.

However, it is inadvisable to store the final casting slip, since the amount of water in the final mix is small and any evaporation has an adverse effect on the casting properties. Also, the final mix is a heavy viscous suspension and requires an appreciable amount of energy for stirring. Generally, therefore, the amount of casting slip prepared corresponds to the available casting molds. The process is controlled by checking the weight per liter of the slip, and its viscosity and flow, i.e. the ability to fill in a plaster mold and to form a free flowing surface. Topping up is not necessary because of the small water content of the slip and the negligible amount of settling in the mold.

The mixture in the mold may be dried by standing at ambient temperature for a suitable time. Generally, several days are required to dry large objects at ambient temperature. More preferably, the mold may be maintained at a slightly elevated temperature overnight, i.e. about 10 to 20 hours at a temperature of about 40 to 70° C. If preferred, the cast may be introduced directly into a kiln and kept for a period at about 100° C. to drive off the residual water. Due to the extremely low initial water content of the mixture and the presence of substantial quantities of comparatively large basalt particles, defects such as warping or cracking which are commonly encountered in the drying of conventional slip-casting materials are not produced during drying of the compositions of this invention.

The dry cast product is readily released from the mold and has good mechanical strength so that it may be handled easily. The cast product is then fired at the desired temperature, between about 950 and 1200° C. A firing temperature of about 950 to 1150° C. is employed for the low temperature fired materials and about 1160 to 1200° C. for the high temperature fired materials. At midrange, e.g. about 1140 to 1160° C., the specific characteristics of the product depend on the particular clay and basalt and proportions thereof in the composition and the product may have charatceristics intermediate between those of the high low temperature fired product, especially with respect to water absorption properties.

It is desirable to avoid deformtaion of the shapes, and preferably the cast product is set in sand or protected in a saggar from uneven heating.

To obtain the low-temperature fired materials, the dried cast product, which may be raw glazed if desired is fired up to about 950 or 1150° C. using heating rates of up to 200° C. per hour. A typical firing schedule for thick walled objects, that is objects having a thickness greater than about one inch, is the following. The temperature in the furnace is raised to about 800 to 900° C. fairly rapidly, i.e. about 150° C. per hour; the temperature is then held at 800 to 900° C. for about 2 or 3 hours and an oxidizing atmosphere is maintained. After this, the temperature is raised at a rate of about 150° C. to 200° C. per hour to the final temperature of up to about 950° to 1150° C. and held at this temperature for 2 to 4 hours. For thin walled objects, i.e. objects having a thickness of less than about 1 inch, no oxidation or low temperature "soaking" is employed and the temperature is raised at a rate of about 150° C. per hour to the maximum desired temperature and held at this temperature for about one hour.

In order to obtain a high temperature fired material, the firing schedule is substantially the same as that just described for the low temperature fired materials, however the material is fired at a final temperature between about 1160° to 1200° C. and held at this temperature for about 1 to 2 hours.

The most desirable temperature for firing the present ceramic products varies to a certain degree depending on the particular type of basalt used. Practically all types of basalt melt in the range of 1160° to 1220° C. However, for any particular basalt, it is usually desirable to carry out firing tests either on the basalt itself or on samples of basalt and clay mixtures in order to establish the melting point of the basalt and hence the best temperature for firing compositions containing the particular basalt. By firing tests is meant that either the basalt itself, or mixtures of basalt and clay are prepared according to the present invention and fired at various temperatures within the range of about 900 to 1150° C. with the object of effecting sintering or partial fusion of the component materials and to produce a heterogeneous product in which the basalt particles are usually clearly distinguishable. In producing the high temperature fired materials, temperatures within the range of about 1150 to 1200° C. are used, with the aim of producing melting of some components of the basalt which results ultimately in the production of substantially homogeneous product. The optimum firing temperature then, may be determined by trial and error i.e. examination and testing of the product obtained at each temperature.

The total shrinkage of the product as a result of firing is only about 2 to 4% of the mold dimensions.

Some of the important physical properties of the high and low temperature fired basalt clay ceramics of the present invention are summarized in Table 3.

TABLE 3.—PHYSICAL PROPERTIES OF BASALT-CLAY CERAMICS

| | Ceramic fired to 950° C. | Ceramic fired to 1,050° C. | Ceramic fired to 1,200° C. |
|---|---|---|---|
| Modulus of rupture [1] (lb./sq. in.) | 462–545 | 600–750 | ca. 6000 |
| Compressive strength [1] (lb./sq. in.) | | 2,500–3,100 | 18,000–36,000 |
| Density (lb./cu. ft.) [2] | 121–126 | 121–126 | 140–157 |
| Water absorption (percent) [3] | | 8–12 | 0.6–1.3 |
| Total linear shrinkage [4] (percent) | | 0.8–2.5 | 0.8–3.0 |

[1] ASTM standard test C133-55 (1961).
[2] ASTM standard test for bulk density C134-41 (1961).
[3] ASTM standard test C373-56.
[4] ASTM standard test C326-56.

The present high temperature fired ceramic is highly acid resistant and heat shock resistant. The acid resistance of the present high temperature fired ceramic has been determined according to British Standard Tests 784/1953 (British Standard Institution; Methods of Test for Chemical Stoneware); the loss of weight of the present ceramics was between 4.6 and 5.5 percent. Fused basalt of European origin subjected to the same tests had a loss in weight of 12.8%.

The heat shock resistance of the present high temperature fired ceramic product was determined in comparison to fused basalt by means of the following test. Two 1 inch cubes of basalt clay and fused basalt were heated in 50° steps from 300° to 550° C., and then immediately quenched in water from each temperature. The fused basalt shattered on quenching from 550° C., while the basalt clay material was undamaged.

With reference to the figures, dilatomertic curves for the high temperature and the low temperature fired ceramics of the present invention and for fused basalt were determined by means of a Chevenard dilatometer. The dilatometric curves of FIGS. 1–3, i.e. curves of the products of the present invention do not show any discontinuities which would indicate anomalous expansion of the materials giving rise to poor thermal properties. The absence of significant free silica in the present materials is reflected by the absence of discontinuities in the curves which would be caused by quartz or cristobalite inversions. These curves also show that the expansion of the present ceramics is lower than that of fused basalt. The fact that the dilatometric curves of the present ceramic product are less steep than that of fused basalt is further evidence of superior thermal properties of the present products.

The high temperature fired ceramic of the present invention in addition to the advantageous characteristics already mentioned is highly abrasion resistant. The abrasion resistance of the present ceramics has been tested under severe industrial conditions. For example, a basalt-clay panel is presently in use in an ash sluice at a power station and appears to be superior in performance to more expensive materials.

The properties of the ceramic compositions of the present invention may be further improved and modified by the addition of other materials. Such materials include for example zircon and iron oxide which increase the abrasion resistant of the ceramics and which may also improve other mechanical properties thereof, and compounds of lead, boron, cadmium and other neutron absorbing materials which render the present ceramics useful in the construction and shielding of nuclear power plants and in other aspects of nuclear technology. These materials may replace up to about 50% by weight of the clay-basalt mixture.

A basalt-clay zircon tile has been used on the top of a tunnel kiln car. While the material is not classified as a refractory, if the maximum kiln temperature is below 1200° C., the hard abrasive material stands up well.

The initial slip composition of igneous rock, clay and water may include glass, lead silicate or a suitable mineral such as feldspar. If desired, these materials, which for the present purpose are considered to be fluxes, may be used for obtaining the low temperature fired ceramics of the present invention in an amount of up to about 20% by weight of the basalt-clay mixture.

It is another feature of the present invention that the basalt, clay and water composition used in the present process of slip-casting are also suitable for preparing ceramic articles by pressing. Pressing is, in general, a faster and less costly operation than slip-casting and is therefore very suitable for production of comparatively small articles such as tile. Unexpectedly, it has been found that large size articles can be pressed from the composition of the present invention. For example, large ceramic pipes having a diameter of 2 ft. or more can be readily produced by pressing, using the compositions of the invention.

Further the present process of producing basalt-clay ceramic products by pressing is exceedingly economical when used to prepare both large and small size articles. The relatively costly materials commonly employed in the production of pressed products are not required for the present compositions, wherein basalt and clay are the principal ingredients.

Another advantage of using the compositions of the invention for pressing is that there is no post expansion of the pressed products following the pressing operation. Post expansion often occurs with conventional pressing compositions due to the comparative elasticity of some of the constituents of the composition and particularly due to the comparatively large amounts of water normally required.

While exactly the same basic basalt-clay-water composition used for slip-casting may also be used as a pressing composition, the pressing composition may obtain as little as 5% by weight of water and no deflocculating agent is used in the pressing compositions.

The clays used in the slip-casting compositions may also be used to produce pressed products, however in addition, similar but lower grade clays can be used. The clays used for pressing compositions must be fine-grain and have similar properties to slip-casting clays, especially that of producing high green strength in pressed articles. Clays which are regarded as of somewhat lower grade than slip-casting clays, such as clays of the montmorillonite and halloysite type may be used in addition to the ball clays and clays of the kaolinite, dickite and illite type used in the present slip-casting compositions.

Usually, the maximum amount of water in the pressing compositions of the present invention is about the same as that of slip-casting compositions, i.e. about 15%, but it may be desriable to use as much as 20% by weight of water depending upon the particular clay employed.

When small low temperature fired ceramic articles such as wall or floor tiles are prepared by pressing according to the present invention, it is preferable to use basalt particles which are substantially all in the fine size range of about 180 to 200 mesh. Other articles involving the use of basalt particles in a graduation of sizes may also be prepared by pressing.

The method of preparation of compositions for pressing is substantially the same as that described for the slip-casting compositions; likewise, the general techniques for drying and firing the pressed product are the same as employed for the slip-cast product.

Conventional pressing equipment can be used to form articles from the compositions and the pressures involved will vary according to the size and shape of the article to be pressed. Normally these pressures will be the same as, or slightly less than, the pressures normally employed in the art.

The properties and appearance of the pressed, fired products are generally similar to slip-cast articles. By means of the present process, clay-basalt-water compositions may be slip cast or pressed into cladding tiles and other building materials of large area which can be dried and fired with or without glazing at temperatures in the range of about 950° to 1150° C. with relatively little linear shrinkage. The present tiles are inexpensive to produce, compare favorably in price, properties and finish with conventional materials such as facing stone slabs. Ornamental products such as garden pottery, table tops, flower pots and the like are also advantageously produced by the present process.

The abrasion and corrosion resistant ceramic produced by firing the present dried, cast and pressed products at high temperatures of about 1160°–1200° C. have advantageous properties in comparison with traditional stoneware, namely lower thermal expansion and better heat shock resistance. The low total shrinkage of the products in manufacturing is a particular advantage of the present invention, in applications where large areas with a minimum of joints are required.

The following examples further illustrate the best mode currently contemplated for carrying out the present invention, however these examples must not be construed as limiting the scope of the invention in any manner.

EXAMPLE 1

(a) Preparation of the slip

Ball clay 661 (described in Table 1 and the ECC Ball Clay Book referred to above) in an amount of 1430 grams was dispersed in 1430 cc. of water and 50 cc. of 28% ammonia, together with 8.5 grams of "Calgon" (which is sodium hexametaphosphate, $Na_2(Na_4P_6O_{18})$), using a high-speed mixer. Basalt fines (⅛ inch graded) and nongraded fines (see columns 2 and 4, Table 2) each in an amount of 3570 grams were mixed with the clay slip using a dough mixer with a one-third H.P. motor until a uniform mixture was obtained.

(b) Preparation of the cast product

The mixture of clay, basalt, water and deflocculating agent was poured into molds having the dimensions of 12″ x 12″ x 1″. The molds are placed in an oven and maintained at about 50° C. overnight (about 16 hours). The casts were then easily released from the molds and could be handled readily due to their good mechanical strength.

(c) Preparation of low temperature fired ceramic

Several of the cast products were then placed in an electric globar furnace and fired by raising the furnace temperature at 150° C. per hour to 1050° C. and holding at this temperature for about one hour.

The resultant product had a smooth finish. Its body consisted of a buff colored clay matrix which appeared to contain a proportion of basalt fines. Larger basalt particles were clearly visible.

The product having the same physical appearance could be formed by firing with the same schedule at a maximum of 950° C. The properties of these products are given in Table 3. A plot of the percent expansion of the product fired at 1050° C. VS. temperature was obtained by means of a Chevenard dilatometric and is illustrated in FIG. 1.

(d) Preparation of the high temperature fired ceramic

The cast products were fired in the electric furnace by raising the temperature at 150° C. per hour up to 1200° C. and holding at this temperature for one hour.

The product which resulted was a dark-colored, dense, semivitrified body with a hard surface. The body was dark brown, almost black in color, and appeared to be completely homogeneous. No individual basalt particles were visible. The total shrinkage in the longest dimension was only 0.8% of the mold dimension.

Figure 2:
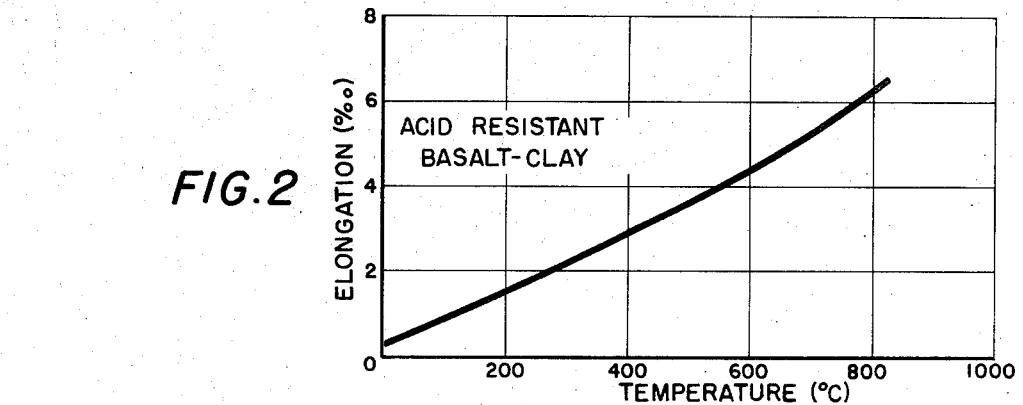
Figure 3:
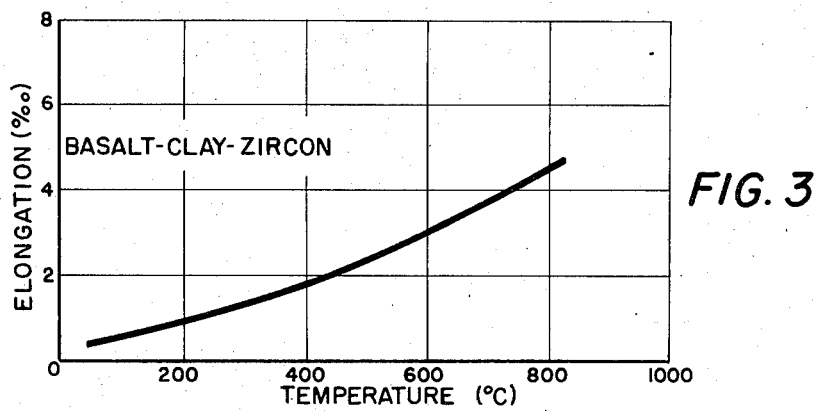
Figure 4:
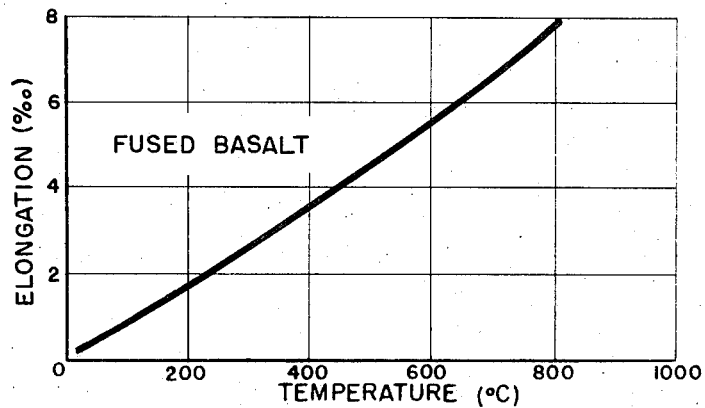

The physical properties of the product obtained (determined on several samples) are given in column 4 of Table 3. The dilatometric curve for this product, obtained by means of a Chevenard dilatometer is illustrated in FIG. 2.

EXAMPLE 2

(a) Using the procedure of Examples 1(a) and (b), 12" x 12" x 1" tiles were cast from a slip consisting of 2000 grams of Ball clay F (Table 1), 6000 grams of ⅛" graded basalt fines (Table 2), 2000 grams of non-graded basalt fines (Table 2), 1500 cc. of water, 50 cc. of 28% ammonia and 15 grams of "Calgon."

(b) The dried tiles were fired in four batches using the procedure of Example 1(c), with maximum temperatures of 950° C. for two of the batches and 1050° C. for the other two batches. The products in each were similar in appearance to those of Example 1(c). The physical properties determined for each batch were as follows:

|  | Fired at 950° C. | Fired at 1,050° C. |
| --- | --- | --- |
| Density (lb./cu. ft.) | Batch (a) 123 | Batch (c) 123. |
|  | Batch (b) 124 | Batch (d) 125. |
| Modulus of rupture (lb./sq. in.) | Batch (a) 527 | Batch (c) 674. |
|  | Batch (b) 545 | Batch (d) 750. |

EXAMPLE 3

(a) Preparation of the slip

Ball clay F (refer to Table 1) in an amount of 1000 grams was dispersed with 800 cc. of water, 60 cc. of 28% ammonia and 200 cc. of 5% "Calgon" solution using a high-speed mixer. Basalt fines (⅛" graded) (column 2, Table 2) in an amount of 4500 grams, 2100 grams of zircon sand (91% retained on 150 mesh BSS sieve) and 3200 gram of zircon sand (minus 200 BSS mesh) and 5 grams of barium carbonate were mixed with the clay slip until a uniform mixture was obtained using a dough-type mixer with a one-third H.P. motor. The barium carbonate is added to precipitate soluble sulphates which act as flocculants and thus interfere with slip formation.

(b) Preparation of the cast product

The basalt, zircon, clay slip was poured into brick molds measuring 9" x 4½" x 3". The molds were dried by heating in an oven overnight (16 hours) at 50° C.

(c) Preparation of low temperature fired basalt-zircon ceramic

The dried bricks were fired in an electric globar furnace using the following firing schedule:

Heat at 150° C. per hour to 900° C.;
Hold at 850° C. for two hours in an oxidizing atmosphere;
Heat at 150 to 200° C. per hour to 1100° C.;
Hold at 1100° C. for three hours.

The characteristics of the resultant bricks are set forth in Table 4 below.

(d) Preparation of the high temperature fired basalt-zircon ceramic

The bricks were fired in an electric globar furnace using the firing schedule given above except that the maximum temperature was 1200° C. and the holding period at that temperautre was 2 hours.

The properties of the resultant fired product are set forth in Table 4 below.

TABLE 4

| Firing temperature, ° C. | Modulus of rupture (p.s.i.) | Compressive strength (p.s.i.) | Density | Open porosity, percent |
| --- | --- | --- | --- | --- |
| 1,100 | 700 | 4,320 | 2.71 | 19.75 |
| 1,200 | 1,980 | 13,600 | 2.87 | 10.86 |

EXAMPLE 4

(a) Preparation of pressing composition

Ball clay 661 (see Table 1) in an amount of 2000 grams and basalt (non-graded fines—see column 4, Table 2) in an amount of 8000 grams were mixed together a pantype mixer. Water in an amount of 1000 cc. was added and the mixing continued until a uniform mixture was obtained.

(b) Preparation of pressed product

The basalt clay water mixture was pressed into 6" x 6" x ¾" architectural cladding tiles using a wall tile friction press operating at a pressure of about 200 to 300 kg./cm. The pressed tiles were dried at about 80° C. in an oven for about sixteen hours. The pressed tiles could be handled readily due to their good mechanical strength.

(c) Preparation of low temperature fired pressed ceramic

The tiles were dried in an oven at about 80° C. for sixteen hours. After drying, the tiles were fired according to the procedure given in Example 1(c).

The appearance and physical properties of the tiles were essentially the same as those described for the slip-cast product in Example 1(c).

What I claim and desire to secure by Letters Patent is:

1. An acid resistant and heat shock resistant ceramic product consisting essentially of a fused, substantially homogeneous mixture of basalt rock particles in an amount of about 75% to 85% by weight based on the weight of the mixture and 25% to 15% by weight of slip-casting clay based on the weight of the mixture.

2. An acid and heat-shock resistant ceramic product according to claim 1 in which said product has a density of about 140–157 lbs./cubic feet, and a compressive strength of about 18,000–36,000 lbs./sq. in.

3. An acid and heat-shock resistant product according to claim 1 which absorbs only about 0.6–1.3% by weight of water.

4. An acid and heat-shock resistant ceramic product according to claim 1 in which said basalt particles, initially prior to firing to cause said particles to sinter are a mixture of particles varying in size from about ⅛ inch to fines.

5. An acid and heat-shock resistant ceramic product consisting essentially of a fused, substantially homogeneous mixture of basalt rock particles and slip-casting clay resulting from firing to a temperautre of about 1200° C. a water-containing shaped product consisting essentially of a mixture of about 75 to 85% by weight of basalt rock particles having a particle size of minus ⅛ inch and slip-forming clay in an amount of about 25 to 15% by weight, each amount being based on the weight of the mixture.

6. A process for the manufacture of an acid and heat-shock resistant ceramic product comprising the steps of mixing basalt rock particles ranging in size from about ⅛ inch to fines and a slip-casting clay in an amount of 15%–25% by weight based on the mixture of rock particles and clay together with enough water to form a slip, pouring said slip into a mold and drying the mixture therein to form the cast product, removing said cast product from the mold, and firing the thus obtained cast product at a temperature of about 1200° C., thereby obtaining fusion of the components of the mixture to produce a substantially homogeneous product which is highly acid and heat-shock resistant.

7. Process according to claim 6 in which said water in an amount of about 10-14% by weight of said mixture is used to form said slip and in which a deflocculating agent selected from at least one member of the group consisting of sodium polyphosphate, ethylenediaminetetraacetic salt, sodium oxalate and ammonia is included in said mixture.

References Cited

UNITED STATES PATENTS

| | | | |
|---|---|---|---|
| 2,062,514 | 12/1936 | Hoof | 123—169 |
| 2,230,206 | 1/1941 | Sproat | 106—11 |
| 2,527,390 | 10/1950 | Blaha | 106—44 |
| 2,807,727 | 9/1957 | Fermi et al. | 250—108 |
| 2,942,991 | 6/1960 | Smith | 106—44 |
| 3,199,992 | 8/1965 | Moffitt | 264—56 |
| 3,278,324 | 10/1966 | Nelson | 117—23 |
| 3,123,886 | 3/1964 | Miller, Jr. | 264—86 |
| 3,189,668 | 6/1965 | Miller, Jr. | 264—86 |
| 3,360,595 | 12/1967 | Wittels | 264—63 |
| 3,418,401 | 12/1968 | Henry et al. | 264—86 |

FOREIGN PATENTS

| | | | |
|---|---|---|---|
| 619,061 | 3/1949 | Great Britain | 264—56 |
| 1,086,581 | 10/1967 | Great Britain | 264—56 |

OTHER REFERENCES

E. H. Kraus et al.: Mineralogy, 4th edition, 1951, McGraw-Hill Book Co., Inc., New York, pp. 190-193.

J. H. Chesters: Steelplant Refractories, 1957, The United Steel Companies Ltd., Sheffield, England, p. 644.

F. H. Norton: Refractories, 1949, McGraw-Hill Book Co., Inc., pp. 202-203.

DONALD J. ARNOLD, Primary Examiner

J. H. MILLER, Assistant Examiner

U.S. Cl. X.R.

106—45; 264—56, 86